(12) United States Patent
Zhang et al.

(10) Patent No.: US 11,614,819 B2
(45) Date of Patent: Mar. 28, 2023

(54) DISPLAY CIRCUITRY INCLUDING STRAIN GAUGE

(71) Applicant: Apple Inc., Cupertino, CA (US)

(72) Inventors: Zhen Zhang, Sunnyvale, CA (US); Baris Cagdaser, Sunnyvale, CA (US); Chieh-Chien Lin, San Jose, CA (US); Derek Keith Shaeffer, Redwood City, CA (US); Jesse Aaron Richmond, San Francisco, CA (US); Suoming Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 17/003,680

(22) Filed: Aug. 26, 2020

(65) Prior Publication Data

US 2021/0096682 A1    Apr. 1, 2021

Related U.S. Application Data

(60) Provisional application No. 62/906,533, filed on Sep. 26, 2019.

(51) Int. Cl.
| | |
|---|---|
| G09G 5/00 | (2006.01) |
| G06F 3/041 | (2006.01) |
| G01L 1/22 | (2006.01) |
| G09G 3/00 | (2006.01) |
| G06F 3/045 | (2006.01) |

(52) U.S. Cl.
CPC ............ G06F 3/0414 (2013.01); G01L 1/225 (2013.01); G01L 1/2281 (2013.01); G01L 1/2287 (2013.01); G06F 3/045 (2013.01); G09G 3/006 (2013.01); G09G 3/03 (2020.08); *G06F 2203/04102* (2013.01); *G09G 2300/0828* (2013.01); *G09G 2320/0233* (2013.01); *G09G 2354/00* (2013.01)

(58) Field of Classification Search
CPC ................... G06F 3/0414; G06F 3/045; G06F 2203/04102; G09G 3/03; G09G 3/006; G09G 2300/0828; G09G 2320/0233; G09G 2354/00
USPC ........................................................ 345/173
See application file for complete search history.

(56) References Cited

U.S. PATENT DOCUMENTS

| | | | | |
|---|---|---|---|---|
| 3,847,017 | A * | 11/1974 | Watts | ...................... G01L 1/225 73/765 |
| 5,398,194 | A * | 3/1995 | Brosh | ...................... G01B 7/18 702/64 |
| 9,135,863 | B2 | 9/2015 | Duerksen et al. | |
| 9,947,255 | B2 | 4/2018 | Zhang et al. | |
| 10,019,105 | B2 | 7/2018 | Lu | |
| 10,352,789 | B2 | 7/2019 | Koppal et al. | |
| 2016/0041663 | A1 * | 2/2016 | Chen | .................. G06V 40/1318 345/174 |
| 2016/0377501 | A1 * | 12/2016 | Agarwal | ............... G01L 1/2281 73/1.15 |

(Continued)

*Primary Examiner* — Jennifer T Nguyen
(74) *Attorney, Agent, or Firm* — Fletcher Yoder, P.C.

(57) ABSTRACT

A system may include a display driven using display driving circuitry to present an image via pixels. The display driving circuitry may include a sensor core compatible with one or more strain sensing circuits. The same sensor core may be used by a control system of the display to sense a stress applied to a strained region of a display using a current divider sensing circuit and/or a Wheatstone bridge sensing circuit.

20 Claims, 11 Drawing Sheets

(56) References Cited

U.S. PATENT DOCUMENTS

| | | | |
|---|---|---|---|
| 2017/0010723 A1* | 1/2017 | Smith | G06F 3/045 |
| 2017/0060189 A1* | 3/2017 | Sohn | G06F 3/017 |
| 2017/0277296 A1 | 9/2017 | Reynolds et al. | |
| 2019/0004634 A1* | 1/2019 | Liu | G06F 3/041 |
| 2020/0393931 A1* | 12/2020 | Lee | G06F 3/0446 |

* cited by examiner

DISPLAY CIRCUITRY INCLUDING STRAIN GAUGE

CROSS REFERENCE TO RELATED APPLICATIONS

This application claims priority from and the benefit of U.S. Provisional Application Ser. No. 62/906,533 entitled "DISPLAY CIRCUITRY INCLUDING STRAIN GAUGE," filed Sep. 26, 2019, which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to improved display circuitry that includes a strain gauge at least partially disposed within an active area of the display to detect when strain is applied to the display circuitry. Electronic displays are found in numerous electronic devices, from mobile phones to computers, televisions, automobile dashboards, and many more, and could suffer from abnormal operation if subject to too much strain. Under normal conditions, individual pixels of the electronic display may collectively produce images by permitting different amounts of light to be emitted from each pixel. This may occur by self-emission as in the case of light-emitting diodes (LEDs), such as organic light-emitting diodes (OLEDs), or by selectively providing light from another light source as in the case of a digital micromirror device (DMD) or liquid crystal display (LCD).

In some displays, variable amounts of stress are applied to the display over time. When the amount of stress applied at a particular time is greater than a particular threshold amount of strain, the display may be compromised and cause visual artifacts to appear on the display. For example, traces coupling pixels of the display to driving circuitry of the display could decouple or become mechanically compromised and cause visual artifacts, such as lines of discoloration or inconsistent coloring. Furthermore, excessive strain on the display could lead to other undesirable behavior. For example, excessive stress applied to the display could change a resistance of certain electrical components in the display. Left uncompensated, the change in resistance could alter the amount of light emitted by a pixel of the display in response to signals from the driving circuitry of the display (also potentially causing visual artifacts). During manufacturing, special strain gauge devices may measure an amount of stress applied to the display to calibrate circuitry of the display to an expected amount of strain in operation. However, these strain gauge devices used during manufacturing may be removed before deployment to a user. As such, strain gauge devices used during manufacturing may not be available to test displays that have been deployed.

With this in mind, this disclosure relates to systems and methods for improving strain detection within a display. The systems to improve strain detection may involve strain detection systems that are at least partially included within driving circuitry of the display and at least partially included within an active area of the display, wholly included within the driving circuitry, or wholly included within the active area. It is noted that although described in terms of display technology, improvements discussed herein to strain detection may be applied to any other suitable electronic device where improved strain detection is desired.

Systems to detect stress applied to a display may sometimes include a Wheatstone bridge sensor and may sometimes include a current divider sensor. As described herein, the sensing circuitry for each sensor (e.g., Wheatstone bridge sensor, current divider sensor) may share a sensor core to interpret the output of the sensing circuitry. In this way, a display may include one sensor core, and a Wheatstone bridge sensor and/or a current divider sensor. A controller of the display may switch between using the Wheatstone bridge sensor and the current divider sensor for the sensing operation. Furthermore, because the Wheatstone bridge sensor and the current divider sensor may remain within the display during operation after manufacturing, the controller of the display may adjust an operation of the display in response to strain via the sensor core. Since a resistance of the display may change in response to an amount of stress applied to the display, the controller adjusting operation of the display in response to the sensed strain associated with the stress applied may improve operation of the display at least by improving a uniformity of image presented via the display (e.g., by reducing visual artifacts).

BRIEF DESCRIPTION OF THE DRAWINGS

Various aspects of this disclosure may be better understood upon reading the following detailed description and upon reference to the drawings in which.

DETAILED DESCRIPTION

Figure 1:
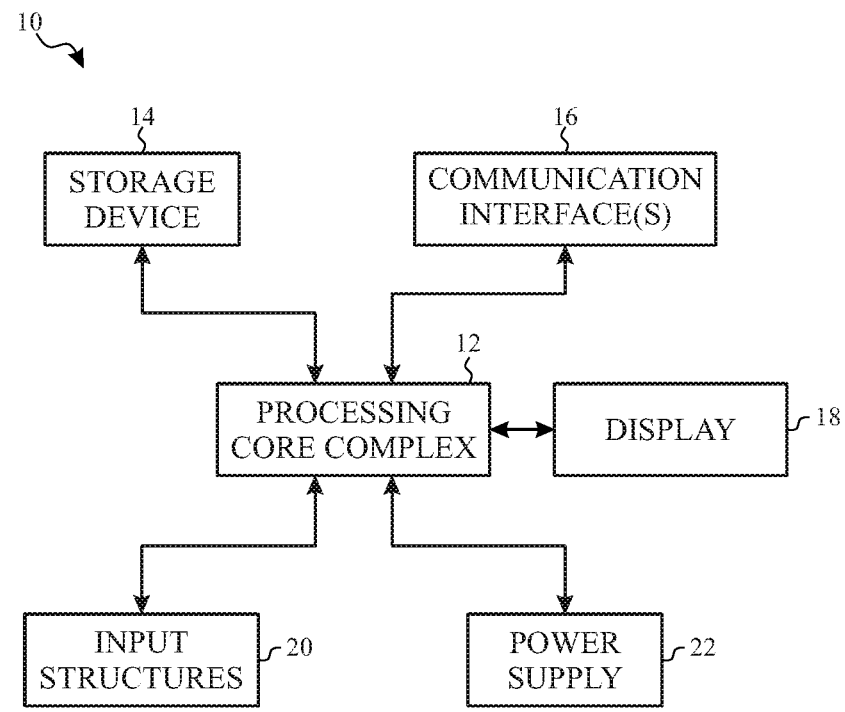
FIG. 1 is a schematic block diagram of an electronic device, in accordance with an embodiment.

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to systems and methods that improve strain detection within an electronic display. Electronic displays may include light-modulating pixels, which may be light-emitting as in the case of light-emitting diode (LEDs), such as organic light-emitting diodes (OLEDs), but may selectively provide light from another light source as in the case of a digital micromirror device (DMD) or liquid crystal display (LCD). While this disclosure generally refers to self-emissive displays, it should be appreciated that the systems and methods of this disclosure may also apply to other forms of electronic displays, and should not be limited to self-emissive displays. When the electronic display is a self-emissive display, an OLED represents one type of LED that may be found in a self-emissive pixel, but other types of LEDs may also be used.

The systems and methods of this disclosure may include a universal integrated sensor core of an electronic display. The strain core may be circuitry used to operate strain detection circuitry or sensing circuitry. The sensor core may be shared by a first strain detection circuit, such as a Wheatstone bridge sensor, and by a second strain detection circuit, such as a current divider sensor. In this way, one sensor core may be used to read multiple types of strain sensor. Using one sensor core for multiple strain sensors may improve manufacturing operations since a universal display panel may be manufactured for many electronic devices without much specific consideration to what type of strain sensor is to be installed in a final electronic device.

A controller of the electronic display may receive sensing data, such as a timing controller, a controller of a driver or driving circuitry of the electronic display, a controller or processing circuitry of a display pipeline used to process image data before presentation, or the like. The sensing data may indicate an amount of stress applied to the electronic display at a location of sensing based on signals generated via the first strain detection circuit or the second strain detection circuit. The controller may use the sensing data in determining an adjustment to make to how the display operates as a way to adjust for any changes in resistance of the electronic display resulting from the amount of stress applied. For example, when a sensed strain is greater than a threshold rate of change or percent change (e.g., greater than 1.5 percent (%), between 1.5% and 2%), the controller may adjust how the display is controlled to compensate for changes in resistance.

In some cases, the controller may switch between using the first strain detection circuit or the second strain detection circuit. To do so, the controller may transmit control signals to the strain core to use either the first strain detection circuit or the second strain detection circuit to generate the sensing data indicative of the amount of stress applied to the electronic display. Furthermore, the strain core may supply the first strain detection circuit and the second strain detection circuit with a same driving current to generate the sensing data indicative of the amount of stress applied to the electronic display. In this way, circuitry generating the driving current may be shared between the first strain detection circuit and the second strain detection circuit.

To determine the amount of stress applied, the strain core may receive various outputs from the first strain detection circuit and the second strain detection circuit. The first strain detection circuit and the second strain detection circuit may include a variety of resistances. The resistances may generate electrical signals response to the driving current. The electrical signals may be leveraged to sense the amount of stress applied to the area adjacent to the resistances. The strain core uses the electrical signals to generate the sensing data, such as by correlating electrical signals sensed over time to determine the sensing data indicative of the amount of stress applied at the resistances (e.g., applied to at least a portion of the electronic display). In some cases, however, the strain core may include additional analog-to-digital conversion circuitry such that the electrical signals may be correlated simultaneously rather than over time. Determining strain using sensing data gathered spatially rather than over time may improve sensing accuracies since resistance changes over time are negligible.

Keeping this in mind, a general description of suitable electronic devices that may include a self-emissive display, such as an LED (e.g., an OLED) display, and corresponding slew booster circuitry of this disclosure are provided. FIG. 1 is a block diagram of one example of a suitable electronic device 10 may include, among other things, a processing core complex 12 such as a system on a chip (SoC) and/or processing circuit(s), a storage device 14, communication interface(s) 16, a display 18, input structures 20, and a power supply 22. The blocks shown in FIG. 1 may each represent hardware, software, or a combination of both hardware and software. The electronic device 10 may include more or fewer elements. It should be appreciated that FIG. 1 merely provides one example of a particular implementation of the electronic device 10.

The processing core complex 12 of the electronic device 10 may perform various data processing operations, including generating and/or processing image data for presentation on the display 18, in combination with the storage device 14. For example, instructions that are executed by the processing core complex 12 may be stored on the storage device 14. The storage device 14 may be volatile and/or non-volatile memory. By way of example, the storage device 14 may include random-access memory, read-only memory, flash memory, a hard drive, and so forth.

The electronic device 10 may use the communication interface(s) 16 to communicate with various other electronic devices or elements. The communication interface(s) 16 may include input/output (I/O) interfaces and/or network interfaces. Such network interfaces may include those for a personal area network (PAN) such as Bluetooth, a local area network (LAN) or wireless local area network (WLAN) such as Wi-Fi, and/or for a wide area network (WAN) such as a cellular network.

Using pixels containing LEDs (e.g., OLEDs), the display 18 may show images generated by the processing core complex 12. The display 18 may include touchscreen functionality for users to interact with a user interface appearing on the display 18. Input structures 20 may also enable a user to interact with the electronic device 10. In some examples, the input structures 20 may represent hardware buttons, which may include volume buttons or a hardware keypad. The power supply 22 may include any suitable source of power for the electronic device 10. This may include a battery within the electronic device 10 and/or a power conversion device to accept alternating current (AC) power from a power outlet.

Figure 2:
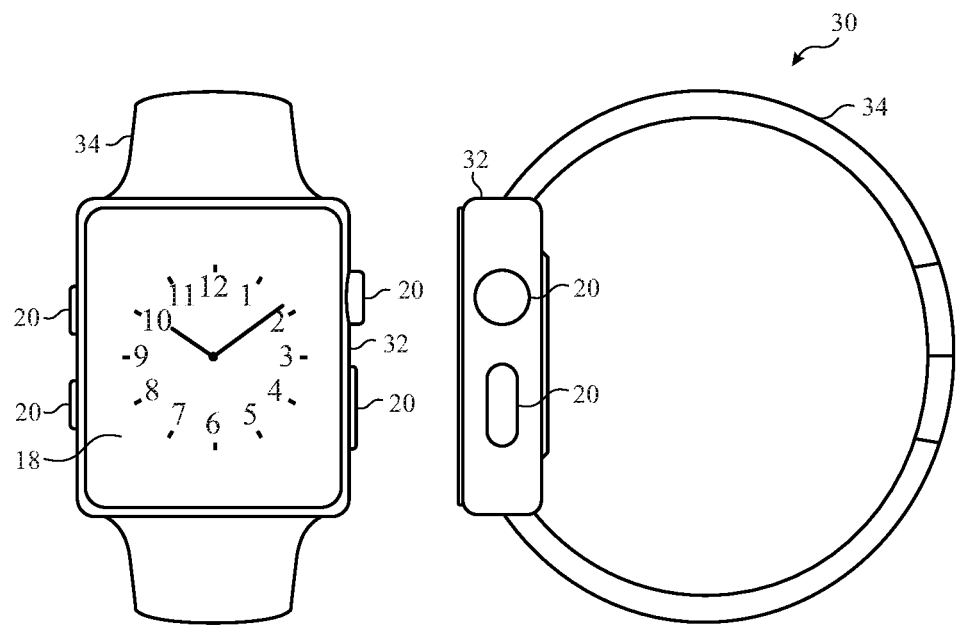
FIG. 2 is a perspective view of a watch representing an embodiment of the electronic device of FIG. 1, in accordance with an embodiment.

As may be appreciated, the electronic device 10 may take a number of different forms. As shown in FIG. 2, the electronic device 10 may take the form of a watch 30. For illustrative purposes, the watch 30 may be any Apple Watch® model available from Apple Inc. The watch 30 may include an enclosure 32 that houses the electronic device 10 elements of the watch 30. A strap 34 may enable the watch 30 to be worn on the arm or wrist. The display 18 may display information related to the watch 30 operation, such as the time. Input structures 20 may enable a person wearing the watch 30 to navigate a graphical user interface (GUI) on the display 18.

Figure 3:
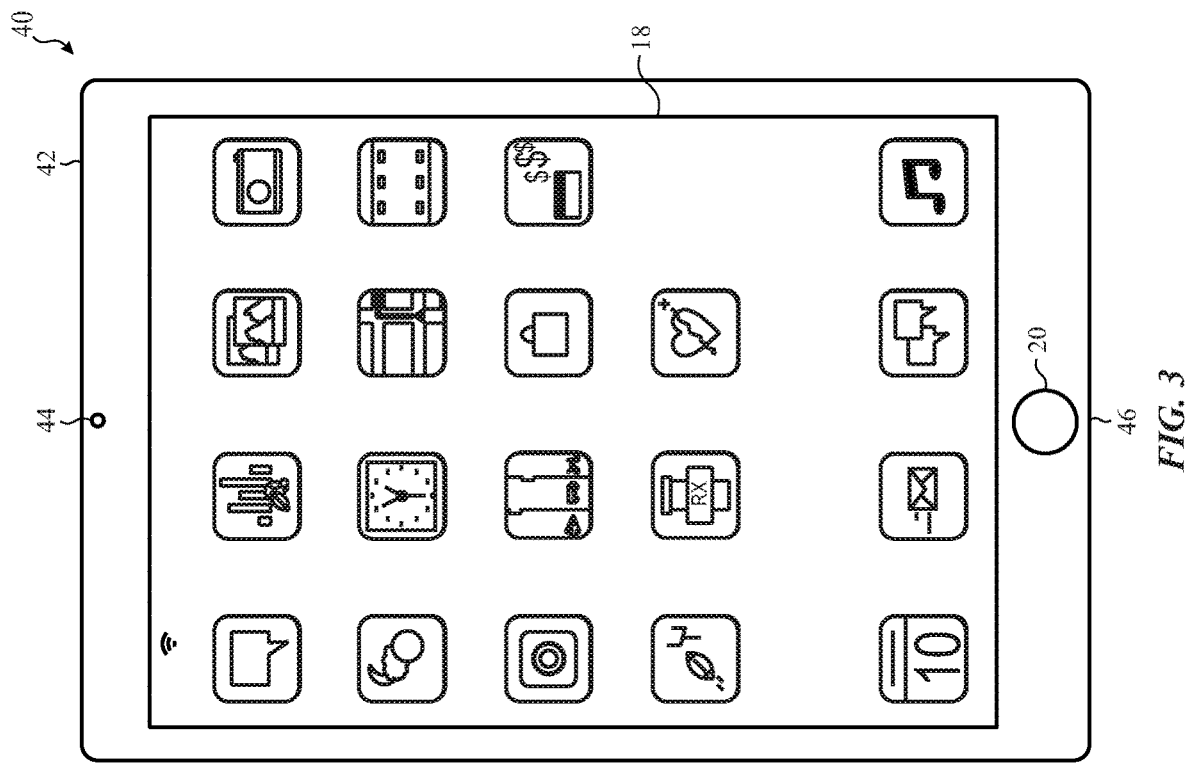
FIG. 3 is a front view of a tablet device representing an embodiment of the electronic device of FIG. 1, in accordance with an embodiment.

The electronic device 10 may also take the form of a tablet device 40, as shown in FIG. 3. For illustrative purposes, the tablet device 40 may be any iPad® model available from Apple Inc. Depending on the size of the tablet device 40, the tablet device 40 may serve as a handheld device such as a mobile phone. The tablet device 40 includes an enclosure 42 through which input structures 20 may protrude. In certain examples, the input structures 20 may include a hardware keypad (not shown). The enclosure 42 also holds the display 18. The input structures 20 may enable a user to interact with a GUI of the tablet device 40. For example, the input structures 20 may enable a user to type a Rich Communication Service (RCS) message, a Short Message Service (SMS) message, or make a telephone call. A speaker 44 may output a received audio signal and a microphone 46 may capture the voice of the user. The tablet device 40 may also include a communication interface 16 to enable the tablet device 40 to connect via a wired connection to another electronic device.

Figure 4:
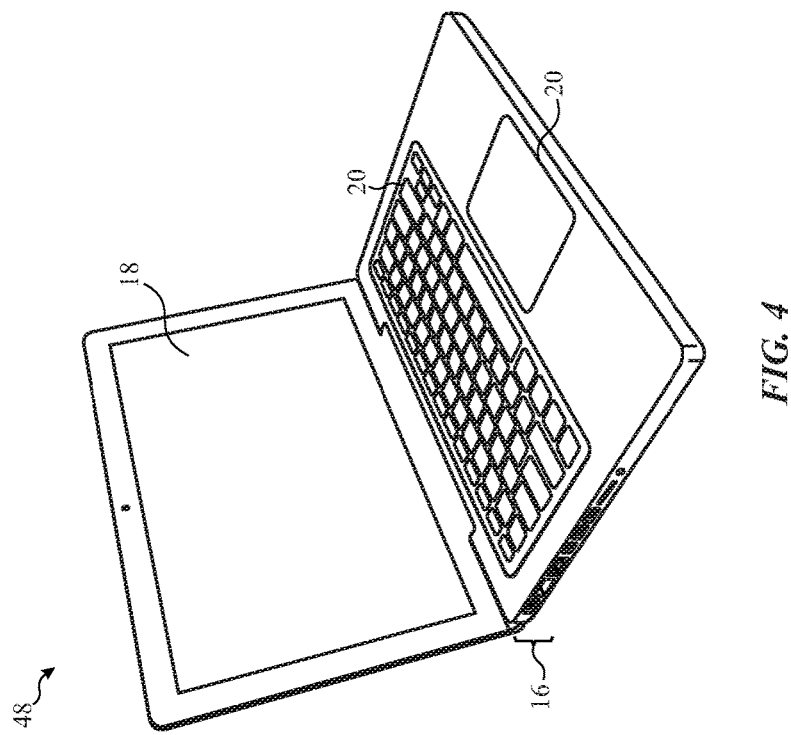
FIG. 4 is a front view of a computer representing an embodiment of the electronic device of FIG. 1, in accordance with an embodiment.

A computer 48 represents another form that the electronic device 10 may take, as shown in FIG. 4. For illustrative purposes, the computer 48 may be any Macbook® or iMac® model available from Apple Inc. It should be appreciated that the electronic device 10 may also take the form of any other computer, including a desktop computer. The computer 48 shown in FIG. 4 includes the display 18 and input structures 20, such as in the form of a keyboard and a track pad. Communication interfaces 16 of the computer 48 may include, for example, a universal serial bus (USB) connection.

Figure 5:
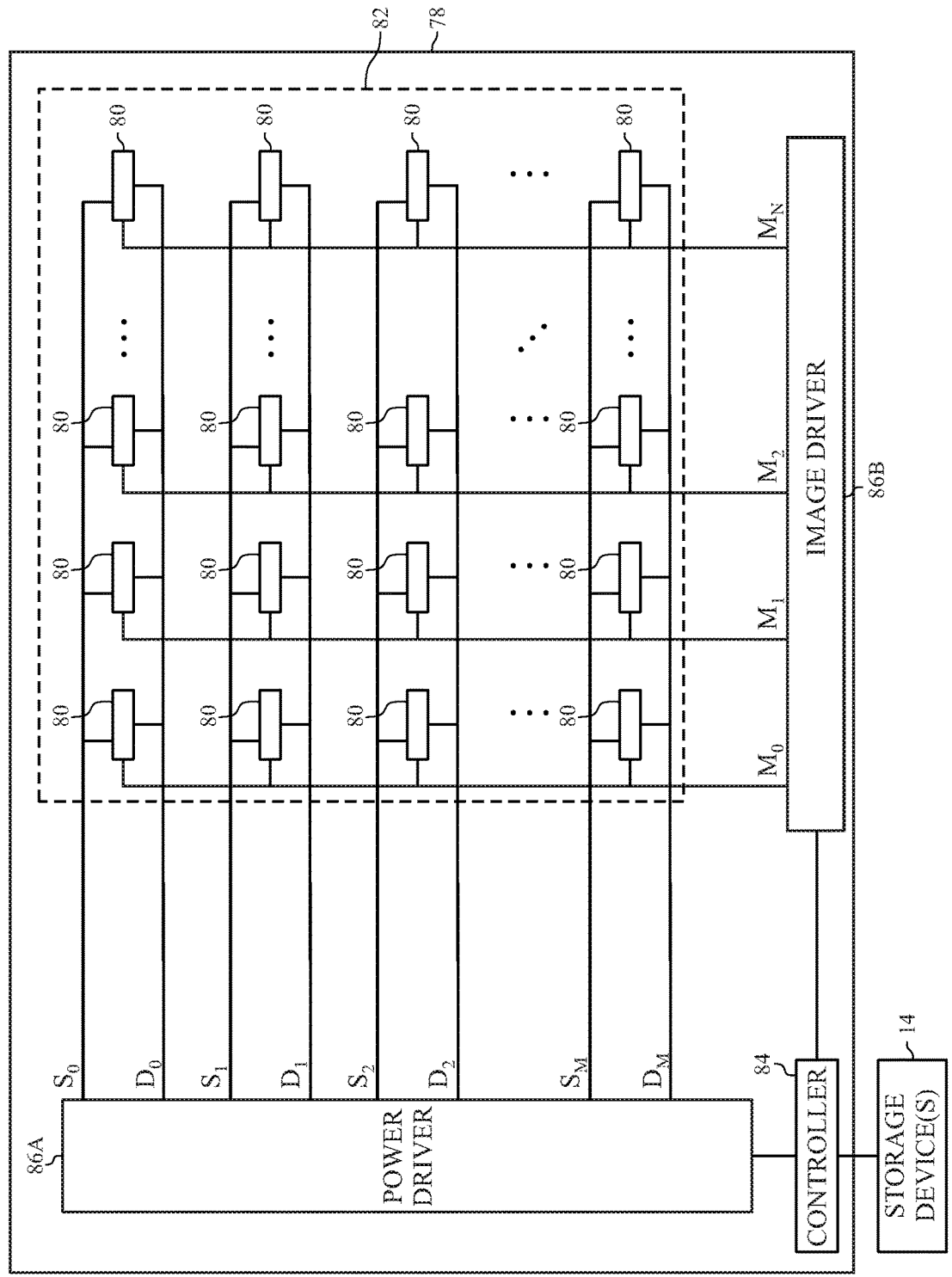
FIG. 5 is a circuit diagram of the display of the electronic device of FIG. 1, in accordance with an embodiment.

The display 18 may include a pixel array 78 having an array of one or more pixels 80 within an active area 82. The display 18 may include any suitable circuitry to drive the pixels 80. In the example of FIG. 5, the display 18 includes a controller 84, a power driver 86A, an image driver 86B, and the array of the pixels 80. The power driver 86A and image driver 86B may drive individual of the pixels 80. In some cases, the power driver 86A and the image driver 86B may include multiple channels for independent driving of multiple pixels 80. Each of the pixels 80 may include any suitable light-emitting element, such as a LED, one example of which is an OLED. However, any other suitable type of pixel may also be used. Although the controller 84 is shown in the display 18, the controller 84 may sometimes be located outside of the display 18. For example, the controller 84 may be at least partially located in the processing core complex 12.

The scan lines S0, S1, . . . , and Sm and driving lines D0, D1, . . . , and Dm may connect the power driver 86A to the pixel 80. The pixel 80 may receive on/off instructions through the scan lines S0, S1, . . . , and Sm and may receive programming voltages corresponding to data voltages transmitted from the driving lines D0, D1, . . . , and Dm. The programming voltages may be transmitted to each of the pixel 80 to emit light according to instructions from the image driver 86B through driving lines M0, M1, . . . , and Mn. Both the power driver 86A and the image driver 86B may transmit voltage signals as programmed voltages (e.g., programming voltages) through respective driving lines to operate each pixel 80 of an active area 82 at a state determined by the controller 84 to emit light. Each driver 86 may supply voltage signals at a duty cycle and/or amplitude sufficient to operate each pixel 80.

The intensities of each pixel 80 may be defined by corresponding image data that defines particular gray levels for each of the pixels 80 to emit light. A gray level indicates a value between a minimum and a maximum range, for example, 0 to 255, corresponding to a minimum and maximum range of light emission. Causing the pixels 80 to emit light according to the different gray levels causes an image to appear on the display 18. In this way, a first brightness level of light (e.g., at a first luminosity and defined by a gray level) may emit from a pixel 80 in response to a first value of the image data and the pixel 80 may emit at a second brightness level of light (e.g., at a first luminosity) in response to a second value of the image data. Thus, image data may facilitate creating a perceivable image output by indicating light intensities to be generated via a programmed data signal to be applied to individual pixels 80.

The controller 84 may retrieve image data stored in the storage device 14 indicative of various light intensities. In some examples, the processing core complex 12 may provide image data directly to the controller 84. The controller 84 may control the pixel 80 by using control signals to control elements of the pixel 80. The pixel 80 may include any suitable controllable element, such as a transistor, one example of which is a metal-oxide-semiconductor field-effect transistor (MOSFET). However, any other suitable type of controllable elements, including thin film transistors (TFTs), p-type and/or n-type MOSFETs, and other transistor types, may also be used.

The controller 84 may use a driving signal (e.g., programming voltage, programming current) and transmitted control signals to control the luminance, also sometimes referred to as brightness, of light (Lv) emitted from the pixel 80. It should be noted that luminance and brightness are terms that refer to an amount of light emitted by a pixel 80 and may be defined using units of nits (e.g., candela/m²) or using units of lumens. The driving signal may be selected by a controller 84 to cause a particular luminosity of light emission (e.g., brightness level of light emitted, measure of light emission) from a light-emitting diode (LED) (e.g., an organic light-emitting diode (OLED)) of the self-emissive pixel 80 or other suitable light-emitting element.

As depicted, the display 18 is generally flat. This, however, is not always the case. Sometimes, the display 18 includes curved portions, or portions that otherwise bend into or out of a flat plane (e.g., a plane parallel to a substrate of the display 18). Physical pressure or weight placed on these curved portions may experience different affects from physical stress than a flat portion of the display 18. Variable stress applied to the display 18 may cause presentation of images to be non-uniform. For example, stress applied to the display 18 may affect a resistance (e.g., internal resistance) of one or more portions of the display 18. Behaviors of some of the pixels 80 of the display 18 or other circuitry of the display 18 (e.g., how the pixel 80 responds to an input signal) may change in response to a changing resistance of the display 18. If left uncompensated, visual artifact(s) may manifest on the display 18 due at least in part to strain-induced operational changes of the pixels 80.

Stress applied to the display 18 may be sensed using strain gauges. Strain gauges may be used during manufacturing when designing and/or calibrating the display 18 to determine an effect of different amounts of stress on the display 18 and the operation of the display 18. However, operation of the display 18 may improve when a strain gauge is included in the display 18 beyond a time of manufacturing. For example, the display 18 may reference a sensed amount of strain generated by a strain gauge during operation to determine how to compensate for a stress applied to the display 18. Furthermore, in some cases, an amount of stress applied may exceed operational ranges and/or acceptance limits of stress. In these cases, the display 18 may generate an alert indicating that one of the operational ranges is exceeded, and thus the display 18 is at risk of damage due to an amount of stress applied to at least a portion of the electronic device 10.

Figure 6:
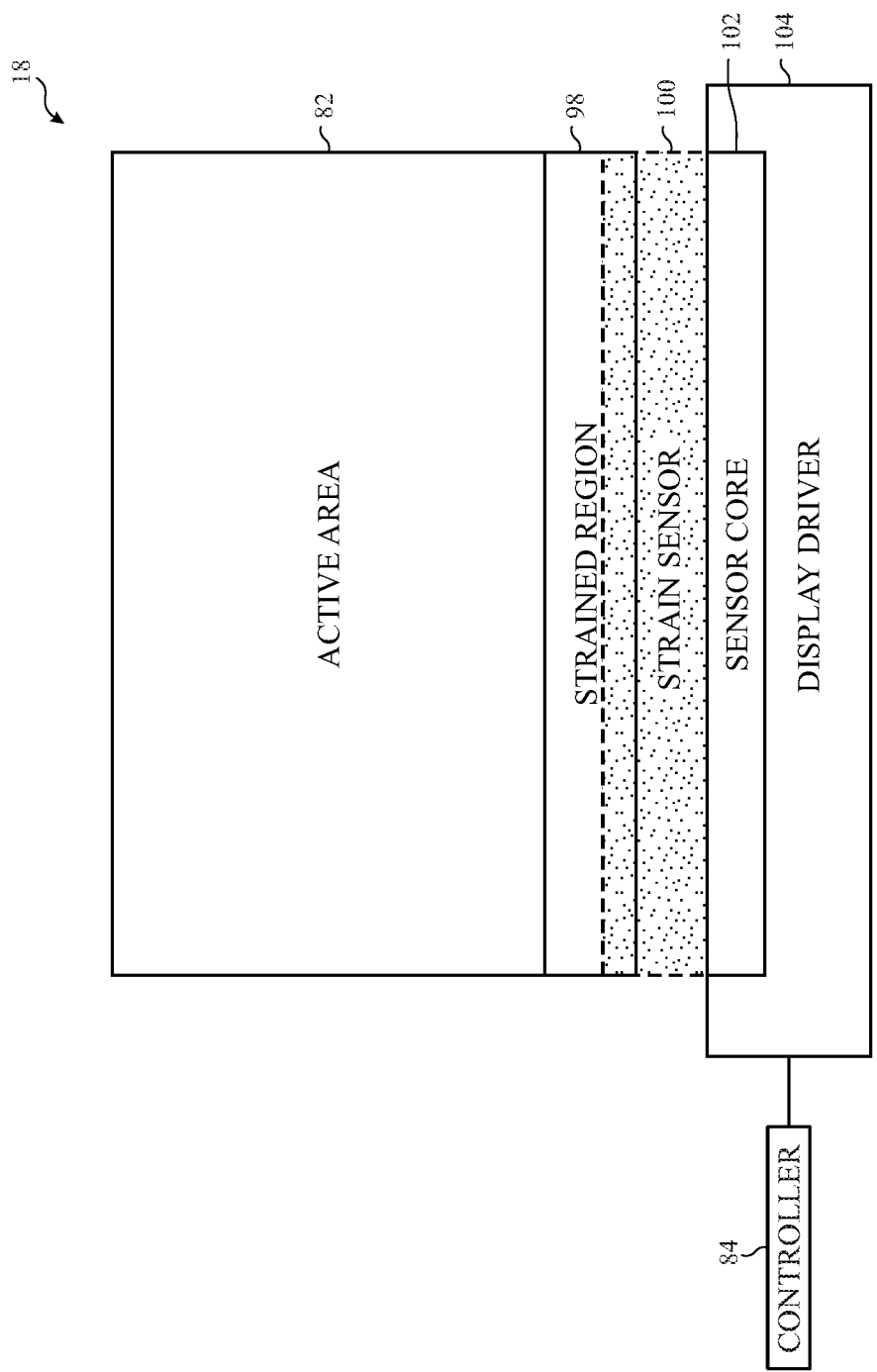
FIG. 6 is a block diagram of the display of FIG. 5 including a strain sensor, in accordance with an embodiment.

To help illustrate, FIG. 6 is a block diagram of an example of the display 18 undergoing strain. The display 18 includes the active area 82 and a strained region 98. The strained region 98 is a curved portion, or a portion that otherwise bends into or out of a flat plane parallel to a substrate associated with the active area 82. The display 18 may include a wholly and/or partially curved screen, where a portion of the at least partially curved screen is included in the strained region 98.

A strain sensor 100 may disposed at least partially within the strained region 98 and couples to a sensor core 102 (e.g., sensor core circuitry, integrated sensor core). The sensor core 102 may include hardware, software, or a combination of these, disposed in a display driver 104 of the display 18 and configurable to read one or more sensors. The display driver 104 may be the power driver 86A and/or the image driver 86B, or any suitable driving circuitry associated with a region that experiences strain to be sensed. In this way, the sensing circuitry described herein may not be limited to application and/or use within the display 18, and may be implemented at any reasonable position within the electronic device 10 for use in detecting strain and/or stress applied to a portion of the electronic device 10.

The controller 84 may communicatively couple to the display driver 104, allowing the display driver 104 and the controller 84 to communicate. The controller 84 may use an amount of strain sensed via the sensor core 102 to determine how to change an operation of the display 18 and/or of the electronic device 10. For example, the controller 84 may increase a driving voltage or driving current used to drive one or more pixels 80 in response to the sensor core 102 sensing an increase in resistance of a resistor of the strain sensor 100 in the display 18. It is noted that although depicted as coupled to the display driver 104, additional control circuitry may additionally or alternatively use the sensor core 102 to determine how to change an operation of the display 18 and/or the electronic device 10. For example, a controller or processing circuitry of a display pipeline may use the sensor core 102 to determine an amount of strain to help determine a compensation operation to perform when processing image data.

The strain sensor 100 may include a variety of suitable circuitry able to detect stress applied to the display 18, and, in particular, the stress applied to the strained region 98 and/or a region nearby or otherwise affecting a resistance of the strain sensor 100. In some embodiments, the strain sensor 100 may include multiple sensing circuits (e.g., one or more strain sensing circuitries) that the sensor core 102 is able to select in response to ongoing operations of the electronic device 10, ambient operating conditions of the electronic device 10, and/or a type of strain applied to the electronic device 10. For example, some operations of the electronic device 10 may result in an increased likelihood of a type of strain being applied to the electronic device 10, such as operating a particular software application that encourages the electronic device 10 to be physically moved in a particular way. In response to a determination that an operation performed may increase a chance of a particular type of strain, the electronic device 10 may adjust operation of the strain sensor 100 and/or sensor core 102 in anticipation of a strain event.

A variety of strain sensors may be used as the strain sensor 100. The strain sensor 100 may be selected during manufacturing and/or during operation of the electronic device 10. Furthermore, the strain sensor 100 may sense an amount of stress as a sensed strain and the sensor core 102 may use the sensed strain to calibrate one or more operations of the electronic device 10.

Figure 7:
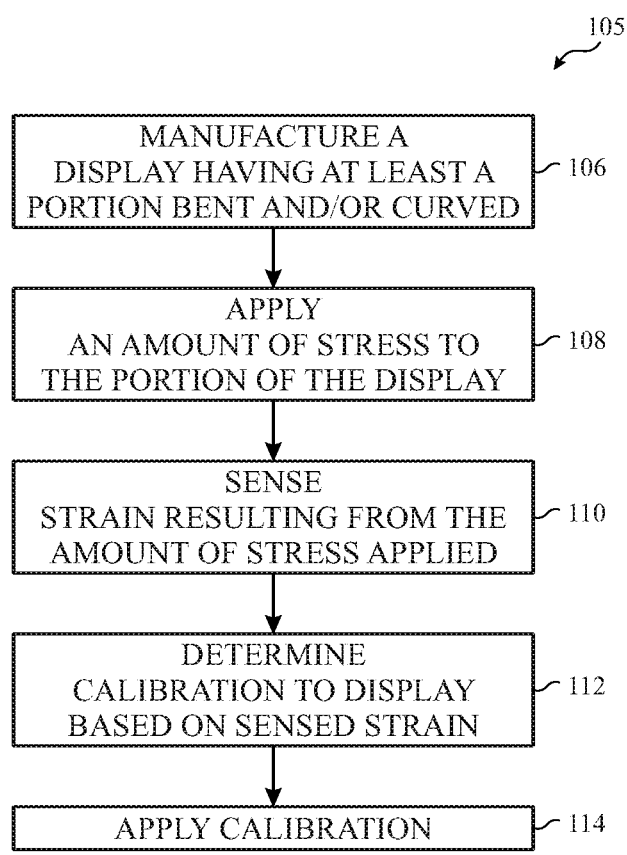
FIG. 7 is a flow chart for a method for determining and applying a calibration to a display based on an amount of strain sensed, in accordance with an embodiment.

For example, FIG. 7 is a flow chart for a method 105 for determining and applying a calibration to the display 18 based at least in part on an amount of strain sensed. Although the following description of the method 105 is described as being a least partially performed by the controller 84, it should be understood that any suitable processing-type device may perform, or facilitate performing, the method 105. For example, one or more processors located in either of the drivers 86 or located external to the display 18 may be used wholly or partially in performing the method 105. In this way, a combination of processing components may perform the method 105. Also, it should be understood that the method 105 may not be limited to being performed according to the order depicted in FIG. 7; and instead may be performed in any suitable order.

Referring now to FIG. 7, at block 106, the display 18 may be manufactured to have at least a portion of the display 18 bent or curved. In this way, the display 18 may present an image formed from image data on a bent, curved surface, or otherwise non-planar surface of the display 18. During use, a bent, curved, or otherwise non-planar surface of the display 18 may experience stress applied in a different way than a planar surface of the display 18 and/or than totally planar displays. In this way, operation of the partially bent or curved display 18 may be calibrated to the fact that it is at least partially bent or curved display 18.

At block 108, an amount of stress may be applied to the at least partially bent or curved portion of the display 18. At block 110, the strain sensor 100 may sense strain at least partially caused by the amount of stress applied to the portion of the display 18. The strain sensor 100 may output sensed voltages to the sensor core 102 for processing. The sensor core 102 may determine the sensed amount of strain based on a difference between a resistance of the strain sensor 100 before the stress was applied and the resistance of the strain sensor 100 while the stress was applied. The amount of strain that results at least partially from the stress being applied may be proportional to the change in resistance of the strain sensor 100.

At block 112, the sensed amount of strain may be used to determine a calibration to be applied to an operation of the display 18. The calibration may include adjusting how image data is processed, a refresh rate of the display 18, or the like. At block 114, the determined calibration may be applied to the display 18. For example, image data processing operations may be adjusted as part of the determined calibration, where the adjustment to the image data processing operations may be based on the sensed strain (e.g., a response of the display 18 to a known amount of applied stress). Sometimes the sensed amount of strain is used to select, from multiple strain sensors, a strain sensor 100 for installation into the display 18. The strain sensor 100 may be selected based on whether a typically applied strain causes a subset of resistances to change within the strain sensor 100 or each resistance to change within the strain sensor 100. In some cases, the strain sensor 100 is selected from one or more strain sensing circuitries while the display 18 and/or the electronic device 10 operates. In this way, an integrated sensor core 102 may be shared between strain sensing circuitries.

Figure 8:
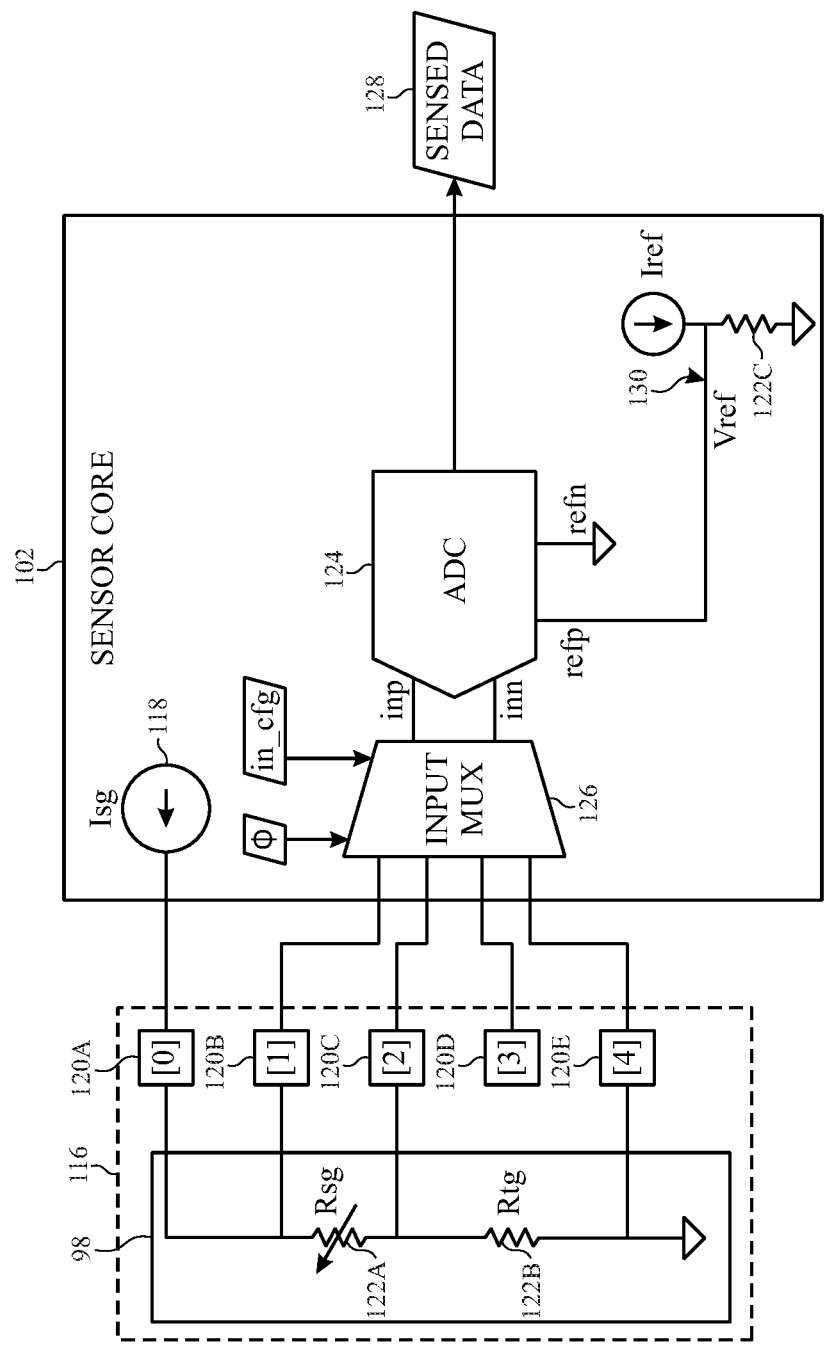
FIG. 8 is a block diagram of an example of sensing circuitry of the strain sensor of FIG. 6, in accordance with an embodiment.

To help elaborate, FIG. 8 is a block diagram of an example strain sensor 100 that includes a current divider sensing circuitry 116 (e.g., resistor ladder, two or more resistors or resistances coupled in a current divider or resistor ladder configuration) disposed partially in the strained region 98. The current divider sensing circuitry 116 is driven by an input current 118 transmitted from the sensor core 102 at terminal 120A via a current source. In response to the input current 118, the current divider sensing circuitry 116 generates electrical signals transmitted to the sensor core 102 via terminals 120 (120B, 120C, 120D, 120E).

The received electrical signals may be used by the sensor core 102 to identify resistance values of resistors 122 (122A, 122B) of the current divider sensing circuitry 116. The resistors 122 may be of any suitable resistance value (e.g., 100 ohms (Ω), 200Ω, 300Ω, 400Ω, and so on) and may be made from a metal that changes resistance in response to a pressure or stress applied. Including loops into the metal wire of the resistor 122 may cause the resistance to change in response to the pressure or stress applied (e.g., 10-14 loops, 12 loops, any suitable number of loops in the wire to change a resistance of the resistor 122). Each resistance of the resistors 122 may change in response to an amount of strain experienced by the strained region 98 and/or an amount of stress applied to the current divider sensing circuitry 116. Furthermore, each of the resistors 122 may be affected by a same change in ambient temperature in a similar way. In this way, when the resistors 122 are influenced by the same temperature, each of the resistors 122 may be expected to change resistance is a substantially similar manner. However, some resistors 122 may be dedicated to sensing temperature and some resistors 122 may be dedicated to strain sensing. Thus, variation between resistances of the resistors 122 may be attributed to stress applied to the resistors 122 since temperature variances may be corrected out during sensing or using the temperature determined via the temperature resistors 122.

Electrical signals received by the sensor core 102 may be used at the analog-to-digital converter (ADC) 124 to identify resistance values of the resistor 122A or the resistor 122B. In particular, the ADC 124 may digitize a difference between electrical signals from the terminal 120B and the terminal 120C to identify the resistance value of the resistor 122A. The ADC 124 may digitize a difference between electrical signals from the terminal 120C and the terminal 120E to identify a resistance value of the resistor 122B. Control signals (e.g., Φ, in_cfg) received by the sensor core 102 at input multiplexer 126 may control which subset of the electrical signals are transmitted to the ADC 124 at any given time. For example, a binary state of the control signal, Φ, may define a subset of the terminals 120 to be electrically coupled to the ADC 124, thereby changing which electrical signals of the resistors 122 are sensed.

Based on signals inputted to the ADC 124, sensed data 128 is generated. The display driver 104 may receive the sensed data 128 and transmit the sensed data 128 to the controller 84 for use in control operations and/or to processing circuitry to be used to generate compensated image data, to record sensed data 128 to track an amount of stress applied over time, or the like. In the current divider sensing circuitry 116, impact of ambient temperature on the resistors 122 may not be automatically compensated for by the way the measurement of strain is performed by the sensor core 102, and may thus be sensed and considered when sensing the strain. For example, the current divider sensing circuitry 116, is a single-ended sensor, so an additional temperature sensing operation may be performed to determine a temperature sensed via the resistor 122B (e.g., a temperature sensing resistor). The sensor core 102 may apply the relationships represented by Equation 1 when using the sensed resistances and/or electrical signals of the current divider sensing circuitry 116 to sense the strain.

$$\phi_{state\ 1} = \frac{Isg * Rsg}{Vref},\ \phi_{state\ 2} = \frac{Isg * Rtg}{Vref} \quad [1]$$

The relationship depicted by Equation 1 illustrates how an output from the ADC 124 may correspond to a desired resistance value of one of the resistors 122. For example, when the control signal Φ is in a first state, the output from the ADC 124 (e.g., $\phi_{state\ 1}$) may indicate a resistance of the resistor 122A (e.g., Rsg) scaled (e.g., multiple) by a value of the input current 118 (e.g., Isg) and divided by a value of a reference voltage 130 (e.g., Vref) generated by a known reference current 132 transmitting through a resistor 122C to a common reference voltage (e.g., ground, 0 volts [V], logical low voltage value). However, when the control signal Φ is in a second state, the output from the ADC 124 (e.g., $\phi_{state\ 2}$) may indicate a resistance of the resistor 122B (e.g., Rtg) scaled (e.g., multiple) by a value of the input current 118 (e.g., Isg) and divided by a value of a reference voltage 130 (e.g., Vref) generated by the known reference current 132 transmitting through the resistor 122C to the common reference voltage. It is noted that in the cases where strain sensor 100 includes more than one sensing circuitry, the control signal, in_cfg, may be used to switch between the sensing circuitries, and thus may correspond to any of a number of states equal to a number of sensors available for selection.

Figure 9:
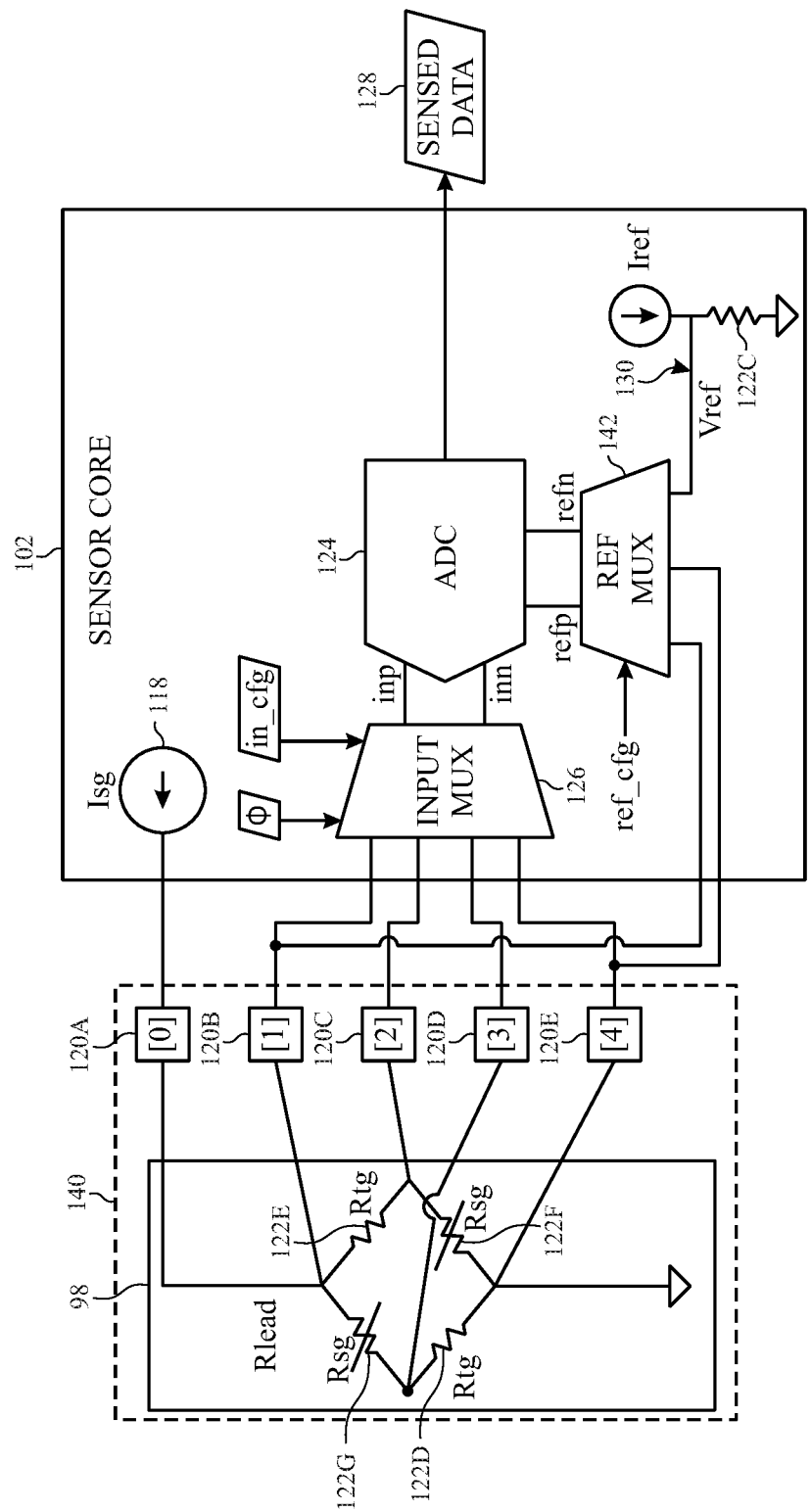
FIG. 9 is a block diagram of a second example of sensing circuitry of the strain sensor of FIG. 6, in accordance with an embodiment.

Taking, for example, the case where the strain sensor 100 includes more than one strain sensor, FIG. 9 is a block diagram of another example portion of the strain sensor 100, Wheatstone bridge sensing circuitry 140 (e.g., resistors or resistances coupled in a Wheatstone bridge configuration). It is noted that although the Wheatstone bridge sensing circuitry 140 and the current divider sensing circuitry 116 are described as within a same strain sensor 100, each may be individually provided within the strain sensor 100 and may be used without the other in an actual implementation.

When the strain sensor 100 includes more than one sensing circuitries, the sensing circuitries may share terminals 120 that couple to the sensor core 102. Although not depicted, it is noted that the Wheatstone bridge sensing circuitry 140 and the current divider sensing circuitry 116 may share the terminals 120 through switching circuitry. The sensor core 102 may transmit control signals to the switching circuitry to selectively couple the Wheatstone bridge sensing circuitry 140 and/or the current divider sensing circuitry 116 to the terminals such that either sensing circuitry may be used to sense strain. The sensor core 102 may transmit the control signal in response to a control signal from the controller 84 being transmitted to one or more of the drivers 86 and/or the sensor core 102.

One or more of the control signals may be provided in response to a determination of a type of the strain expected to be applied to the strained region 98. The determination may be performed based at least in part on historical strain sensing data indicative of the type of strain previously applied to the strained region 98. For example, the controller 84 and/or the sensor core 102 may track strain sensing data over time (e.g., store historical data sets in the storage device 14 of the strain sensing data) and use results from an analysis of the historical strain sensing data to determine an expected type of strain. In some examples, the controller 84 and/or the sensor core 102 may perform an analysis of additional sensing data obtained. The additional sensing data may be of any suitable type of sensing data (e.g., audio data, image data, pressure data, temperature data, altitude data) and may indicate of ambient conditions determined to cause an expected type of strain. For example, the controller 84 and/or the sensor core 102 may perform an additional sensing operation, such as temperature detection and/or velocity detection, and determine that a type of strain is expected based on the combination of conditions. This may be apparent in the case when each of the resistors 122D, 122E, 122F, 122G change during a strain event, such as when the electronic device 10 is dropped and/or when the electronic device 10 is determined to be at an increased likelihood of being dropped. The controller 84 and/or sensor core 102 may use velocity detection to determine the electronic device 10 is in the middle of falling and may suitably change the strain sensing operation in response to the drop. For example, the controller 84 and/or the sensor core 102 may switch to use the current divider sensing circuitry 116 instead of the Wheatstone bridge sensing circuitry 140 in response to detecting that the electronic device 10 was dropped since the current divider sensing circuitry 116 enables a change in resistance of the resistor 122A to be measured independent of the change in resistance of the resistor 122B. The current divider sensing circuitry 116 may also be used when a change in ambient temperature is expected since the resistance value of the resistor 122B may change in response to the ambient temperature independent of the resistance value of the resistor 122A (which changes in response to the strain event).

In general, when the sensor core 102 uses the Wheatstone bridge sensing circuitry 140, the sensor core 102 receives electrical signals from resistors 122 (122D, 122E, 122F, 122G) disposed in the strained region 98. The resistors 122, in some embodiments, may be partially disposed in the strained region 98, such that a subset of the resistors 122 are in the strained region 98 and a subset are outside the strained region 98, the display driver 104 and/or the sensor core 102. This is described in more detail in FIG. 10A and FIG. 10B.

In the Wheatstone bridge sensing circuitry 140, the impact of ambient temperature on the resistors 122 may be automatically compensated. For example, the Wheatstone bridge sensing circuitry 140 is a differential sensor, so an effect of temperature on the Wheatstone bridge sensing circuitry 140 may be filtered out by way of differential sensing between electrical values of the resistors 122. The Wheatstone bridge sensing circuitry 140 may also maximize a range of the ADC 124, enabling increase resolution of data resulting from the strain sensing relative to a resolution of data resulting from using the current divider sensing circuitry 116 to perform the strain sensing.

Generally, the sensor core 102 may use the Wheatstone bridge sensing circuitry 140 by modifying known programmable resistance values (e.g., resistances of resistor 122G and/or resistor 122F) until a voltage difference between electrical signals of terminal 120C and of terminal 120D is substantially zero or minimized. The sensor core 102 may apply the relationships represented by Equation 2 when using the sensed resistances and/or electrical signals of the Wheatstone bridge sensing circuitry 140 to sense the strain.

$$\phi_{state\ 1} = \phi_{state\ 2} = \frac{Rsg - Rtg}{Rsg + Rtg} \quad [2]$$

The relationship depicted by Equation 2 illustrates how an output from the ADC 124 may correspond to a desired resistance value of one of the resistor 122D or resistor 122F. For example, when the control signal $\Phi$ is in a first state or in the second state, the output from the ADC 124 (e.g., $\phi_{state\ 1}$, $\phi_{state\ 2}$) may indicate a difference between resistance values of the resistor 122G or of the resistor 122F and the resistor 122D or the resistor 122E divided by a sum in resistance values of the resistor 122G or of the resistor 122F and the resistor 122D or the resistor 122E. It is noted that the resistance values of the resistor 122G and/or the resistor 122F may be known to the sensor core 102 when sensing strain via the Wheatstone bridge sensing circuitry 140. The relationship shown via Equation 2 may correspond to a double-sampled normal mode of operation for the Wheatstone bridge sensing circuitry 140. When operating in the double-sampled normal mode of operation, the Wheatstone bridge sensing circuitry 140 may receive electrical signals from terminal 120C and from terminal 120D at the ADC 124, and may receive electrical signals from terminal 120B and terminal 120E at reference multiplexer 142. The reference multiplexer 142 may permit various combinations of reference signals used by the ADC 124 in generating a particular output in response to a control signal (e.g., ref_cfg). The sensor core 102 may generate control signals to change an operation of the input multiplexer 126 and/or the reference multiplexer 142. It is noted that since the sensor core 102 may be shared between sensors when the strain sensor 100 includes more than one sensing circuitries, the control signal, in_cfg, input to the ADC 124 may be used to switch between sensing circuitries, as described earlier in reference to the current divider sensing circuitry 116.

In some embodiments, the Wheatstone bridge sensing circuitry 140 may operate in a double-sampled debug mode of operation. The double-sampled debug mode of operation may enable the sensor core 102 to decompose measurements into an Rsg resistance measurement and an Rtg resistance measurement. In this way, the Wheatstone bridge sensing circuitry 140 may detect any strain event and magnitudes of the strain event. The double-sampled mode of operation may enable the sensor core 102 to detect changes in resistance while still benefiting from the differential sensing provided by the Wheatstone bridge sensing circuitry 140 geometry (e.g., high common mode noise rejection property).

When operating in the double-sampled debug mode of operation, the sensor core 102 may receive, during a first phase, electrical signals from the terminal 120C and the terminal 120D, and may receive, during a second phase, electrical signals from the terminal 120B and the terminal 120E. The above-described combination of signals enables the sensor core 102 to apply the relationships described with Equation 3 to an output from the ADC 124.

$$\phi_{state\ 1} = \frac{Isg*(Rsg-Rtg)}{2*Vref},\ \phi_{state\ 2} = \frac{Isg*(Rsg+Rtg)}{2*Vref} \quad [3]$$

Equation 3 may be decomposed into relationships defined by Equation 4.

$$\phi_{state\ 1} + \phi_{state\ 2} = \frac{Isg*Rsg}{Vref},\ \phi_{state\ 2} - \phi_{state\ 1} = \frac{Isg*Rtg}{Vref} \quad [4]$$

The relationships depicted by Equation 3 and Equation 4 illustrate how an output from the ADC 124 may correspond to a desired resistance value of one of the resistor 122D or resistor 122F. For example, referring to Equation 3, when the control signal, $\Phi$, is in a first state, the output from the ADC 124 (e.g., $\phi_{state\ 1}$) may indicate a resistance of the difference between resistances of the resistor 122G or resistor 122F (e.g., Rsg) and between resistances of the resistor 122D or resistor 122E (e.g., Rtg). The difference may be scaled (e.g., multiplied) by a value of the input current 118 (e.g., Isg) and divided by twice a value of a reference voltage 130 (e.g., 2*Vref) generated by a known reference current 132 transmitting through a resistor 122C to a common reference voltage (e.g., ground, 0 volts [V], logical low voltage value). However, when the control signal, $\Phi$, is in a second state, the output from the ADC 124 (e.g., $\phi_{state\ 2}$) may indicate a resistance of the sum between resistances of the resistor 122G or resistor 122F (e.g., Rsg) and between resistances of the resistor 122D or resistor 122E (e.g., Rtg) scaled (e.g., multiplied) by a value of the input current 118 (e.g., Isg) and divided by twice a value of a reference voltage 130 (e.g., 2*Vref) generated by a known reference current 132 transmitting through a resistor 122C to a common reference voltage (e.g., ground, 0 volts [V], logical low voltage value).

Equation 4 illustrates how the relationships of Equation 3 may identify a value for either the resistance of resistor 122G or resistor 122F (e.g., using a sum of the output from the ADC 124 during the first phase with the output from the ADC 124 during the second phase, $\phi_{state\ 1} + \phi_{state\ 2}$). The relationships of Equation 3 may also identify a value for either the resistance of resistor 122D or resistor 122E (e.g., using a difference between the output from the ADC 124 during the first phase and the output from the ADC 124 during the second phase, $\phi_{state\ 2} - \phi_{state\ 1}$). It is noted that the resistance values of the resistor 122G and/or the resistor 122F may be known to the sensor core 102 when sensing strain via the Wheatstone bridge sensing circuitry 140 and while in the double-sampled debug mode of operation.

The method described above with reference to the double-sampled debug mode of operation may thus include applying one or more control signals to hardware of the sensor core 102, receiving one or more electrical signals output from the strain sensor 100 selected via the one or more control signals in response to the input current 118, and determining an amount of strain applied to at least a portion of the strained region 98 at a time of sensing based on the one or more electrical signals output.

The sensor core 102 may identify which of the sensing circuitries of the strain sensors 100 to use to sense strain and to generate the one or more control signals in accordance with sensing operation definitions and the type of sensor selected. For example, control signals transmitted to operate the sensor core 102 to sense strain via the current divider sensing circuitry 116 may include the control signal, in_cfg, selecting the current divider sensing circuitry 116, the control signal, $\Phi$, selecting a subset of terminals 120 from which the sensor core 102 is to receive electrical signals, and the control signal, ref_cfg, to select the reference voltage 130 as the reference voltage for the ADC 124 and the common reference voltage as the reference ground for the ADC 124. The sensor core 102 may use the Wheatstone bridge sensing circuitry 140 when a strain event causes the resistor 122G and/or resistor 122F to change but may use the current divider sensing circuitry 140 when the strain event causes both the resistor 122G and/or resistor 122F to change and the resistor 122D and/or resistor 122E to change.

Table 1 provides a summary of various combinations of the control signals and how the control signals may compare between sensing circuitries of the strain sensor 100 and operational modes of the ADC 124. Table 1 may define various desired modes of operations and may be referenced by the sensor core 102 and/or the controller 84 when determining which combinations of control signals to transmit to hardware of the sensor core 102. In this way, Table 1 may be stored at least partially as a look-up table in the storage device 14 or other suitable memory associated with the display 18. When stored as a look-up table, the sensor core 102 and/or the controller 84 may determine which sensing circuitry 116, 140 to use as the strain sensor 100, then based on the selected sensing circuitry may determine (in the case of the Wheatstone bridge sensing circuitry 140) which mode of operation is desired.

TABLE 1

| Input to receive control signal | Sensing Phase | Sensing Phase 2 |
|---|---|---|
| Double-sampled debug mode of operation for Wheatstone bridge sensing circuitry 140 | | |
| inp | [2] | [1] |
| inn | [3] | [4] |
| refp | vref | vref |
| refn | avss | avss |
| Input to receive control signal | Sensing Phase 1 | Sensing Phase 2 |

TABLE 1-continued

Double-sampled normal mode of operation
for Wheatstone bridge sensing circuitry 140

| inp | [2] | [2] |
| inn | [3] | [3] |
| refp | [1] | [1] |
| refn | [4] | [4] |

Double-sampled normal mode of operation
for current divider sensing circuitry 116

| inp | [1] | [2] |
| inn | [2] | [4] |
| refp | vref | vref |
| refn | avss | avss |

Table 1 illustrates resultant combinations of inputs into the sensor core 102 hardware in response to control signals. A different control signal, ref_cfg, or a control signal having an opposing or differing logical state, may be used to toggle between the positive reference voltage and the negative voltage reference used in the double-sampled debug mode of operation and that used in the double-sampled normal mode of operation for either sensing circuitries. For example, a first control state for the control signal, ref_cfg, may cause the reference multiplexer 142 to output the reference voltage 130 as the positive reference voltage (e.g., refp) and may cause the reference multiplexer 142 to output a common reference voltage as the negative reference voltage (e.g., refn). Similarly, states of control signals may toggle sensor core 102 operation to receive different combinations of inputs from the terminals 120, as represented in Table 1 via [1] (e.g., electrical signal output from terminal 120B), [2] (e.g., electrical signal output from terminal 120C), [3] (e.g., electrical signal output from terminal 120D), and/or [4] (e.g., electrical signal output from terminal 120E).

After transmitting control signals to hardware of the sensor core 102, the sensor core 102 may receive one or more electrical signals output from the strain sensor 100 in response to the input current 118. The electrical signals received by the sensor core 102 and used in strain sensing may change based on the transmitted control signals, as defined in Table 1. Once the sensor core 102 receives the electrical signals, the sensor core 102 may determine an amount of strain applied to at least a portion of the strained region 98 at a time of sensing based on the one or more electrical signals output and using one or more of the relationships defined via Equation 1, Equation 2, and/or Equation 3.

Figure 10:
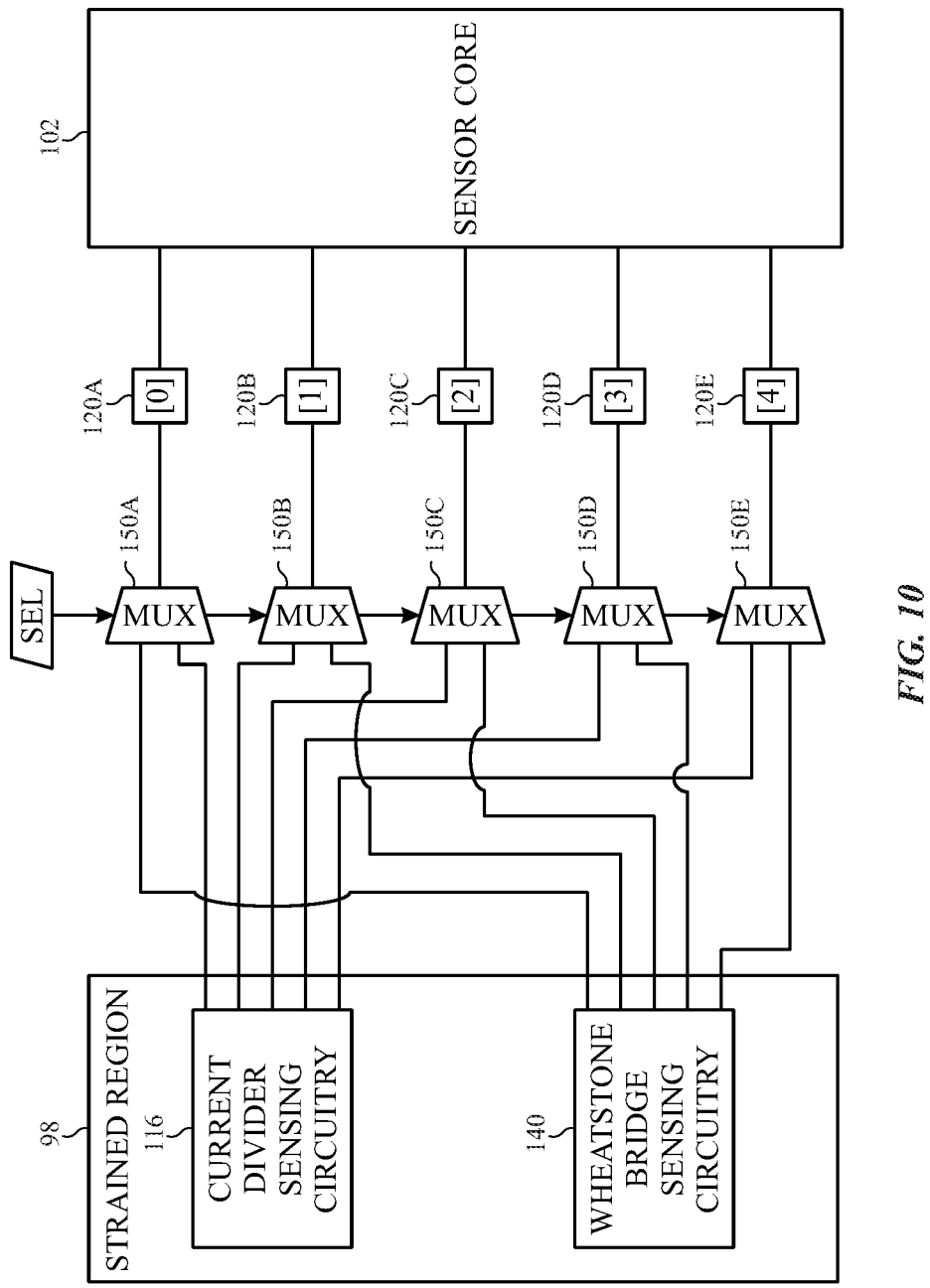
FIG. 10 is a block diagram of an example sensor of a sensor core of the display of FIG. 5 coupled to the example of sensing circuitry of FIG. 8 and to the second example of the sensing circuitry of FIG. 9, in accordance with an embodiment.

To help illustrate, FIG. 10 is a block diagram of an example sensor core 102 that couples to Wheatstone bridge sensing circuitry 140 and current divider sensing circuitry 116 via multiplexers 150 (150A, 150B, 150C, 150D, 150E). To switch between using the Wheatstone bridge sensing circuitry 140 and current divider sensing circuitry 116, the controller 84 and/or the sensor core 102 may transmit a selection signal (SEL) to each of the multiplexers 150 to operate each respective multiplexer 150 into a first state or a second state. The first state may couple the sensor core 102 to the current divider sensing circuitry 116 while the second state may couple the sensor core 102 to the Wheatstone bridge sensing circuitry 140. The sensor core 102 may couple to the multiplexers 150 via the terminals 120.

Figure 11:
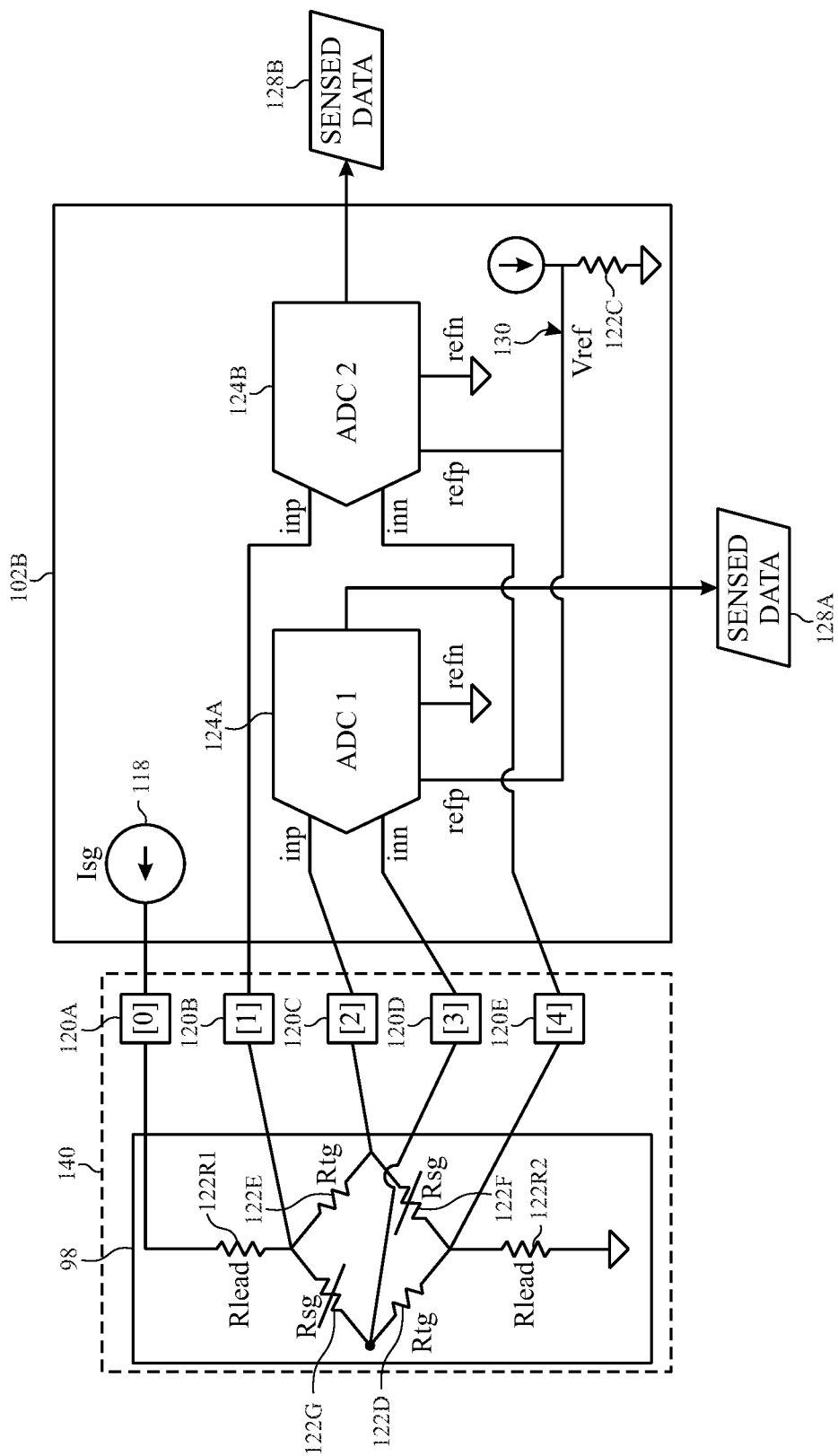
FIG. 11 is a block diagram of an example of a sensor core of the display of FIG. 5, in accordance with an embodiment.

Referring back to descriptions of FIG. 9, in some embodiments, the double-sampling may be performed over multiple frames and/or over multiple sensing time periods when sensing using one ADC 124 within the sensor core 102. However, in some embodiments, two ADCs 124 may be included within the sensor core 102 and used to sense strain from a same stress event. FIG. 11 illustrates an example of this.

FIG. 11 is a block diagram of another example sensor core 102, sensor core 102B coupled to the Wheatstone bridge sensing circuitry 140. It is noted that although depicted as included the Wheatstone bridge sensing circuitry 140, the current divider sensing circuitry 116 may also be used and benefit from the dual ADC 124s. The sensor core 102B may include two ADCs 124 (124A, 124B). Each of the ADCs 124 may directly couple to the terminals 120 and operate according to control signals to perform the double-sampled debug mode of operation for Wheatstone bridge sensing circuitry 140. In this way, the ADC 124A may correspond to the first sensing phase and the ADC 124B may correspond to the second sensing phase. Outputs from the ADC 124A may correspond to sensed data 128A and outputs from the ADC 124B may correspond to sensed data 128B. Since the dual ADCs 124 enable the sensor core 102B to perform at least partially simultaneous sensing phases instead of sequential sensing phases (like shown in embodiments with one ADC 124), the sensed data 128A may be applied to the relationships of Equation 3 and Equation 4 as $\phi_{state\ 1}$ while the sensed data 128B may be applied as $\phi_{state\ 2}$.

The dual ADCs 124 embodiment of the sensor core 102 may permit the sensor core 102 to monitor both strain changes and the sum of resistor values at a same or substantially similar time. Through relatively simple post-processing (e.g., application of Equation 4 via processing core complex 12 or other processing device operation), strain detected by each strain gauge resistor 122 may be detected and leveraged when evaluating a dropping test during manufacturing or evaluating a drop or applied pressure during operation. It is noted that the Wheatstone bridge sensing circuitry 140 includes the resistor 122R1 and resistor 122R2. The resistors 122R1, 122R2 represent a resistance between the strained region 98 of the display 18 and the sensor core 102. At least some loss from the resistance in the transmission path represented by the resistor 122R1, 122R2 is compensated for by measuring the resistance of resistors 122 via the terminal 120C and the terminal 120D and while using electrical signals from the terminal 120B and the terminal 120E as reference signals for the sensing.

Figure 12A:
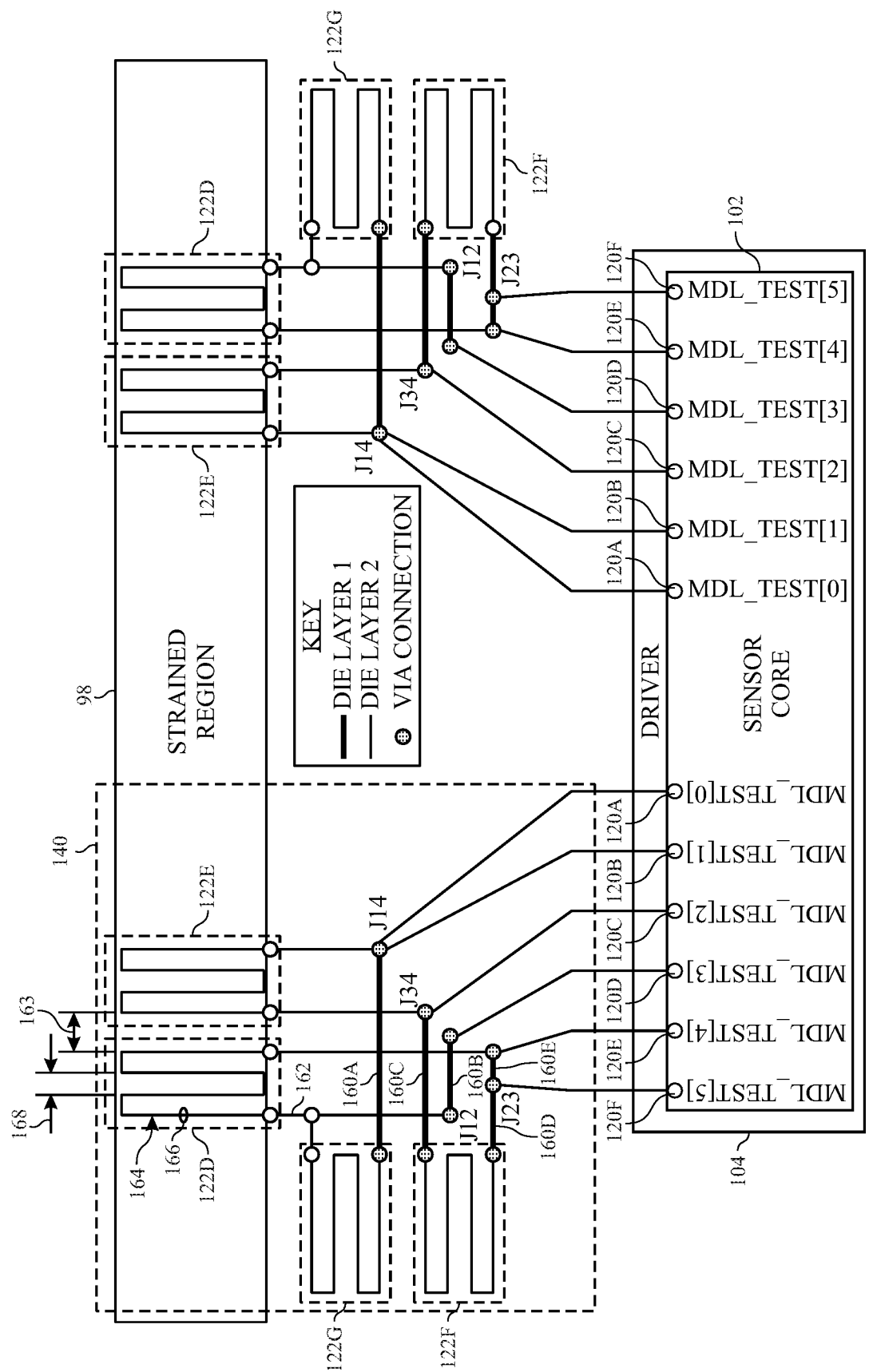
FIG. 12A is a block diagram of an example of Wheatstone bridge sensing circuitry of FIG. 8 partially disposed within a strained region of the display of FIG. 5, in accordance with an embodiment.
Figure 12B:
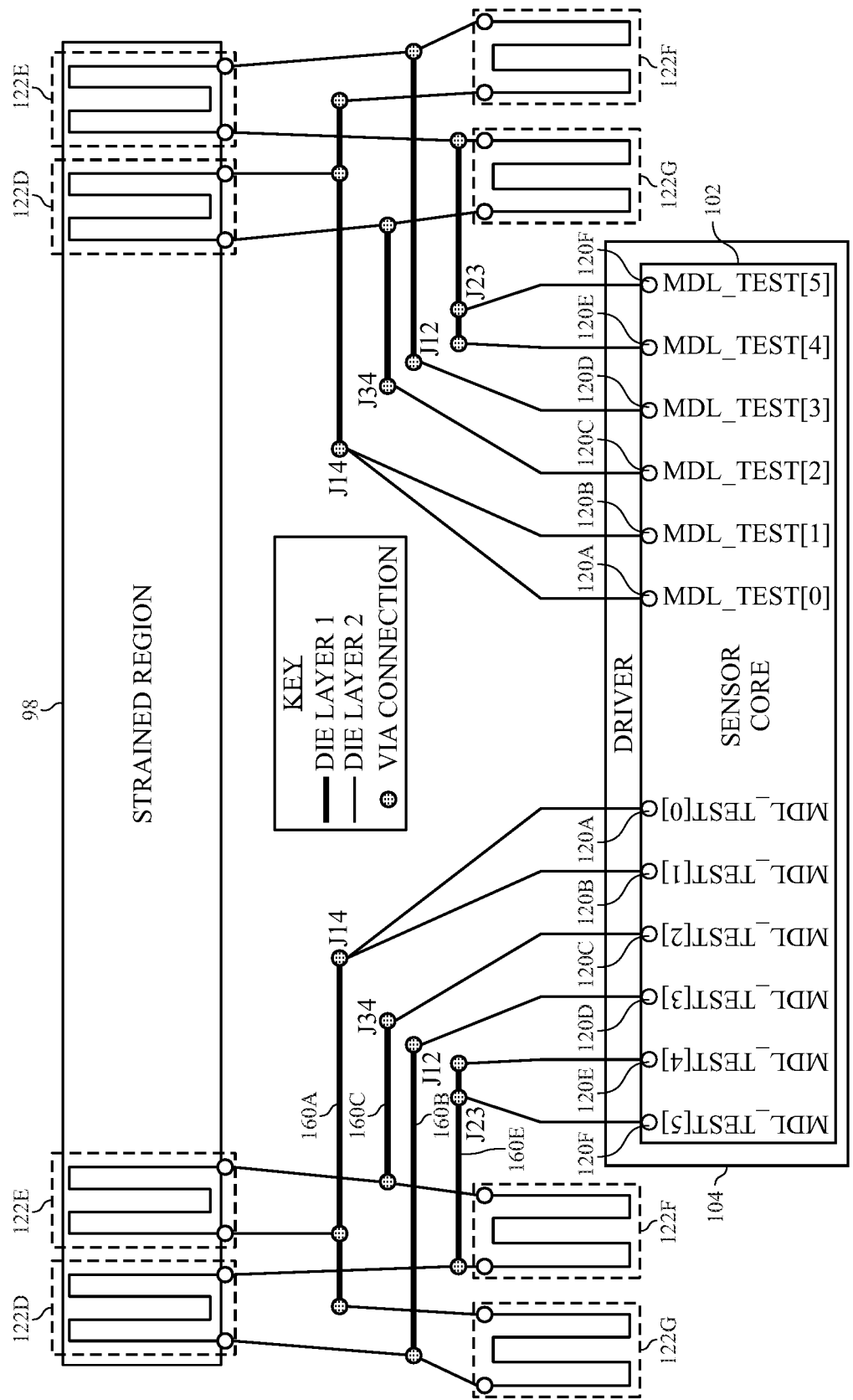
FIG. 12B is a block diagram of another example of Wheatstone bridge sensing circuitry of FIG. 9 partially disposed within a strained region of the display of FIG. 5, in accordance with an embodiment.

It is noted that in some embodiments, a portion of the strain sensor 100 circuitry may be included within the strained region 98 and a portion of the strain sensor 100 circuitry may be included between the strained region 98 and the sensor core 102, such as within the active area 82 of the display 18 and/or within the display 18 outside of the active area 82. FIG. 12A and FIG. 12B depict examples of this.

FIG. 12A is a block diagram showing a portion of the Wheatstone bridge sensing circuitry 140 partially disposed within the strained region 98. Similarly, FIG. 12B is a block diagram showing a portion of the Wheatstone bridge sensing circuitry 140 partially disposed within the strained region 98. FIG. 12A highlights how a subset of the resistors 122 may be disposed within the strained region 98. In this example, the resistor 122D and the resistor 122E are included within the strained region 98, and thus may be the resistors 122 to experience a resistance change in response to an applied stress to the strained region (e.g., the curved or bent region of the display 18). FIG. 12B highlights how the subset of resistors 122 of FIG. 12A may be disposed at a variety of locations and in a variety of geometries within the region between the strained region 98 and the sensor core 102. In this way, the resistor 122G and/or the resistor 122F may be disposed perpendicular to the resistor 122D and/or the resistor 122F, as shown in FIG. 12A. The resistor 122G and/or the resistor 122F may be disposed parallel to the resistor 122D and/or the resistor 122E, as shown in FIG. 12B. Furthermore, in some embodiments, the resistors 122 and/or electrical couplings between resistors 122 and the sensor core 102 may be disposed or embedded within different layers of a substrate of the display 18. For example, the resistor 122F may be disposed on a different layer or on an opposing side of the same layer of the resistor 122G. As an additional example, an electrical coupling 160A between resistor 122G and terminal 120A may be disposed or embedded on a different plane than an electrical coupling 162 between the resistor 122G and the resistor 122D. Electrical couplings 160 (160A, 160B, 160C, 160D, 160E) may each be connections that are able to be disposed or embedded on a different plane respective of the other electrical couplings 160 (e.g., a different die or a different layer of a die, opposite surfaces of a die). For example, electrical coupling 160A may be disposed or embedded on a different plane without the electrical couplings 160B, 160C, 160D, or 160E being disposed or embedded on a different plane. The electrical couplings 160 may couple to other electrical couplings, such as the electrical coupling 162, through via connections (e.g., via J14, via J34, via J12, via J23). In some embodiments, a voltage received at terminal 120F may equal a voltage received at the terminal 12E but transmitted through an additional resistance before being received at the sensor core 102.

It is noted that any suitable physical layout may be used to form the sensing circuitry. For example, the Wheatstone bridge sensing circuitry 140 may include resistors 122 that are spaced a distance 163 between 10 micrometers (μm) and 30 μm apart from each other (e.g., 20 μm). Furthermore each resistor 122 is shown as having 2 loops. It should be understood that any suitable number of loops (e.g., arrow 164) of any suitable material may be used to form a resistor (e.g., titanium, aluminum). For example, 12 loops and/or a number of loops greater than 1 loops may be used as the resistor. Each metal trace 166 of the resistors 122 may be of any suitable width, such as a width between 1 μm and 5 μm (e.g., 3 μm), and have a spacing of a width between 3 μm and 8 μm (e.g., 5 μm). Furthermore, additional resistors 122 may be included to sense additional portions of the display 18. As depicted in FIG. 11A and FIG. 11B, a first Wheatstone bridge sensing circuitry 140 is used to sense a right side of the display 18 and a second Wheatstone bridge sensing circuitry 140 is used to sense a left side of the display 18.

Thus, the technical effects of the present disclosure include display driving circuitry that includes a sensor core compatible with one or more strain sensing circuits. The same sensor core may be used to sense a stress applied to a strained region of a display using a current divider sensing circuit and/or a Wheatstone bridge sensing circuit. Using a same sensor core to couple different sensing circuits to may improve display manufacturing and operation, since the display control system may toggle between sensing circuitries without toggling between different sensor cores for each sensing circuitries. Furthermore, in some embodiments, sensing operations that use the sensing circuitry and the sensor core may become more efficient (e.g., be faster) since a two-phase sensing operation may be performed in parallel via use of dual analog-to-digital converters (ADC).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A display, comprising:
an active area die layer comprising a plurality of pixels, wherein each pixel of the plurality of pixels is configured to present a respective portion of an image frame based on image data;
strain sensing circuitry disposed at least partially in a region of the active area die layer, wherein the strain sensing circuitry comprises a first resistance associated with the active area die layer and a second resistance associated with an additional region outside of the active area die layer;
sensor core circuitry configured to couple to the first resistance and the second resistance of the strain sensing circuitry to record sensed data indicative of an amount of stress applied to the region of the active area; and
a controller configured to:
receive the sensed data; and
adjust at least a subset of the image data based on the sensed data to compensate for the amount of stress applied to the region.

2. The display of claim 1, wherein the strain sensing circuitry includes a resistor ladder configured to generate an output in response to the amount of stress applied to the region of the active area, and wherein the strain sensing circuitry couples to the sensor core circuitry in response to a control signal.

3. The display of claim 1, wherein the strain sensing circuitry includes a Wheatstone bridge configured to generate an output in response to the amount of stress applied to the region of the active area, and wherein the strain sensing circuitry couples to the sensor core circuitry in response to a control signal.

4. The display of claim 1, wherein the controller is configured to provide a control signal to the sensor core circuitry to couple the sensor core circuitry and the strain sensing circuitry.

5. The display of claim 4, wherein the control signal is provided in response to a determination of a type of strain expected to be applied to the region.

6. The display of claim 5, wherein the determination is performed based at least in part on historical strain sensing data indicative of the type of strain previously applied to the region.

7. The display of claim 5, wherein the determination is performed while the plurality of pixels is actively presenting the image frame.

8. The display of claim 1, wherein the strain sensing circuitry comprises a first strain sensing circuitry and a second strain sensing circuitry, and wherein the sensor core circuitry comprises:
an input multiplexer configured to couple the sensor core circuitry to the first strain sensing circuitry at a first time and configured to couple the sensor core circuitry to the second strain sensing circuitry at a second time;
an input current driver configured to couple to the first strain sensing circuitry and the second strain sensing circuitry; and
an analog-to-digital converter configured to receive two or more electrical signals generated in response to a current output from the input current driver and the amount of stress applied to the region.

9. The display of claim 8, wherein the sensor core circuitry is configured to:
receive the two or more electrical signals from the analog-to-digital converter; and
determine, while the amount of stress is applied to the region of the active area die layer, the amount of stress applied to the region based at least in part on the two or more electrical signals.

10. A method, comprising:
transmitting a first control signal to select strain sensing circuitry from at least two strain sensing circuitries disposed at least partially within an active area die layer of a display, wherein the strain sensing circuitry comprises a first resistance associated with the active area die layer and a second resistance associated with a region outside of the active area die layer;
transmitting a second control signal to couple one or more outputs from the strain sensing circuitry to a sensor core disposed within a display driver of the display, wherein each of the at least two strain sensing circuitries are configured to couple to the sensor core in response to a logical state of the first control signal;
receiving at least two electrical signals from the first resistance and the second resistance of the strain sensing circuitry in response to a stress being applied to the strain sensing circuitry;
determining an amount of stress applied to the strain sensing circuitry in response to receiving the at least two electrical signals from the strain sensing circuitry; and
transmitting an indication of the amount of stress to a controller, wherein the controller is configured to adjust at least a subset of image data transmitted to one or more pixels of a plurality of pixels disposed in the active area die layer based on the amount of stress applied to the strain sensing circuitry.

11. The method of claim 10, comprising determining the amount of stress based at least in part on a relationship selected in response to the strain sensing circuitry selected and a desired mode of operation for sensing.

12. The method of claim 10, wherein selecting the strain sensing circuitry from the at least two strain sensing circuitries comprises selecting either current divider sensing circuitry or Wheatstone bridge sensing circuitry as the strain sensing circuitry.

13. The method of claim 10, comprising receiving a third control signal used to generate the first control signal and the second control signal.

14. The method of claim 13, comprising receiving the third control signal in response to an analysis of historical strain sensing data.

15. The method of claim 13, comprising receiving the third control signal in response to an analysis of sensing data indicative of ambient conditions determined to cause an expected type of the strain.

16. A display driver, comprising:
an integrated sensor core configurable to couple to a first sensing circuit, wherein the first sensing circuit is at least partially disposed within an active area die layer having multiple pixels of a display panel, and wherein the first sensing circuit comprises:
a first resistance associated with the active area die layer of the display panel; and
a second resistance associated with an area outside of the active area die layer, wherein the integrated sensor core is configured to generate sensed data based on an amount of stress applied to the first resistance and the second resistance to measure an amount of stress applied to a region of the active area die layer of the display panel; and
a controller configured to:
receive the amount of stress from the integrated sensor core; and
generate compensated image data based on the amount of stress to compensate for the amount of stress applied to the region of the active area die layer.

17. The display driver of claim 16, wherein the integrated sensor core comprises:
an input multiplexer configured to couple to the first sensing circuit and a second sensing circuit;
an input current driver coupled to the first sensing circuit and configured to couple to the second sensing circuit; and
an analog-to-digital converter configured to receive two or more electrical signals generated in response to a current output from the input current driver and the amount of stress applied to at least a portion of the first sensing circuit via the region of the active area die layer, wherein the analog-to-digital converter receives the two or more electrical signals based at least in part on a control signal defining a desired mode of operation.

18. The display driver of claim 17, wherein when the control signal is of a first state, the analog-to-digital converter receives a first voltage reference via a ground reference voltage and a second voltage reference via an electrical coupling between a current source and the first resistance.

19. The display driver of claim 18, wherein when the control signal is of a second state, the analog-to-digital converter receives the first voltage reference and the second voltage reference via a reference multiplexer configured to transmit a subset of the two or more electrical signals as the first voltage reference and the second voltage reference.

20. The display driver of claim 17, wherein the first sensing circuit comprises a Wheatstone bridge including the first resistance, the second resistance, a third resistance, and a fourth resistance, each of which is coupled into a Wheatstone bridge configuration, and wherein the second sensing circuit comprises current divider sensing circuitry comprising two resistances coupled in series as part of a resistor ladder.

* * * * *